United States Patent [19]
Svegliato

[11] Patent Number: 6,062,522
[45] Date of Patent: May 16, 2000

[54] FLEXIBLE ATTACHED LAP PAD CONTAINER

[76] Inventor: Michael J. Svegliato, 3322 Sunrise Dr., Shoreacres, Tex. 77571

[21] Appl. No.: 09/118,479

[22] Filed: Jul. 17, 1998

Related U.S. Application Data

[60] Provisional application No. 60/057,607, Sep. 4, 1997.

[51] Int. Cl.$^7$ .................................................. A47B 91/00
[52] U.S. Cl. ...................... 248/346.01; 248/918; 108/43
[58] Field of Search ........................... 248/346.01, 918, 248/441.1, 444; 108/43; 224/270, 660, 673, 904

[56] References Cited

U.S. PATENT DOCUMENTS

| | | | |
|---|---|---|---|
| 126,213 | 4/1872 | Ireland et al. | 224/270 X |
| 5,069,375 | 12/1991 | Flick | 108/43 X |
| 5,081,936 | 1/1992 | Drieling | 108/43 |
| 5,221,032 | 6/1993 | Bott et al. | 108/43 X |
| 5,295,742 | 3/1994 | Knutson | 108/43 X |
| 5,355,811 | 10/1994 | Brewer | 108/43 |
| 5,358,208 | 10/1994 | Moseley, III et al. | 248/441.1 |
| 5,405,168 | 4/1995 | Holt . | |
| 5,433,407 | 7/1995 | Rice | 248/118.1 |
| 5,460,102 | 10/1995 | Pasmanick | 108/43 |
| 5,542,637 | 8/1996 | Schriner | 248/346.01 |
| 5,680,973 | 10/1997 | Vulpitta et al. | 108/43 X |
| 5,765,790 | 6/1998 | Kuldvere | 108/43 X |
| 5,779,211 | 7/1998 | Bird | 248/918 X |
| 5,862,933 | 1/1999 | Neville | 108/43 X |
| 5,911,397 | 6/1999 | Jokinen et al. | 248/918 X |

*Primary Examiner*—Leslie A. Braun
*Assistant Examiner*—Gwendolyn Baxter
*Attorney, Agent, or Firm*—Jackie Lee Duke

[57] ABSTRACT

A flexible attached lap pad container to minimize user fatigue during manipulation of a computer mouse is disclosed. The flexible attached lap pad container is comprised of five parts: a containment part, a receptacle part, a flexible part, an attachment part, and a pad part. The containment part panels are sized and shaped to enable a comfortable movement of the arms and hands within the containment part to do such things as move a computer mouse, manipulate computer joy sticks, play cards, manipulate toys, cut vegetables, write notes and other work/play activities which can make use of a flat planar surface. The containment part panels are sized and shaped to prevent small items placed within the containment part from falling out of the containment part when not in use. The receptacle part is preferably a rectangular box shape with an open side panel. The top surface of the receptacle part can have a number of slots, holes and openings to hold user items such as pens, pencils, cards, cups, and toys. The flexible part is preferably a rectangular shaped pad that has a width less than the width of the containment part. The flexible part is formed with a plurality of slotted openings to enable an attachment part weave in and out of the slotted openings. The attachment part is a belt with a buckle to allow fastening the belt around a user's waist. The pad part is preferably of a rectangular shape that will fit within the containment part.

7 Claims, 4 Drawing Sheets

FLEXIBLE ATTACHED LAP PAD CONTAINER

This application claims the benefit of U.S. Provisional Application No. 60/057,607, filed Sep. 4, 1997.

BACKGROUND OF THE INVENTION

1. Field of the Invention

This invention relates to an apparatus that facilitates a comfortable placement and movement of the arms and hands to perform such tasks as manipulating a computer mouse or computer joy sticks, playing cards, manipulating toys, cutting vegetables, writing and other activities that can use a flat planar surface. The invention is designated a Flexible Attached Lap Pad Container and is designed to place the planar surface in a comfortable position for the user to minimize repetitive stress injuries such as carpal tunnel syndrome. Additionally, the invention includes a belt for attachment to the user to ensure the Flexible Attached Lap Pad Container remains in proper orientation to the user's body and a pad to support the user's arms and hands during rest intervals. The invention further includes various retaining means to hold items not in immediate use.

2. Description of Related Art

U.S. Pat. No. 5,433,407 to G. H. Rice shows a palm rest for use with a computer mouse. The palm rest is V-shaped to allow the finger and thumb to access the computer mouse readily.

SUMMARY OF THE INVENTION

The flexible attached lap pad container is designed for use in various configurations and for many uses. The flexible attached lap pad container is comprised of five parts: a containment part, a receptacle part, a flexible part, an attachment part, and a pad part. The containment part is preferably rectangular in shape with a vertical back panel and two symmetrically shaped vertical side panels attached to a planar bottom panel. The containment part panels are sized and shaped to enable a comfortable movement of the arms and hands within the containment part to do such things as move a computer mouse, manipulate computer joy sticks, play cards, manipulate toys, cut vegetables, write notes and other work/play activities that can make use of a flat planar surface. The containment part panels are sized and shaped to prevent small items placed within the containment part from falling out of the containment part when not in use. The receptacle part is preferably a rectangular box shape with an open side panel. The receptacle part upper and lower panels will be of a length to enhance the ability of the containment part to retain loose items such as, a computer mouse, pens, pencils, toys and playing cards, when the containment part is rotated toward the vertical plane, such as when a person stands up. The top surface of the receptacle part can have a number of slots, holes and openings to hold user items such as pens, pencils, cards, cups, and toys. When not an integral part of the containment part, the receptacle part top and bottom surfaces can be reversed, and different openings, slots, and holes in the bottom surface can be used. The flexible part is preferably a rectangular shaped pad that has a width less than the width of the containment part. The flexible part is formed with a plurality of slotted openings to enable an attachment part weave in and out of the slotted openings. The attachment part is a belt with a buckle to allow fastening the belt around a user's waist. The pad part is preferably of a rectangular shape that will fit within the containment part.

A principal object of the present invention is to provide a flexible attached lap pad container that minimizes user fatigue during manipulation of a computer mouse.

Another object of the present invention is to provide a flexible attached lap pad container that provides a convenient planar surface on a user's lap that is attached to the user to minimize shifting of the planar surface during use.

A further object of the present invention is to provide a flexible attached lap pad container that is configured to prevent items being used such as a mouse pad, pens, pencils and other items from falling off the flexible attached lap pad container.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENTS

Figure 1:
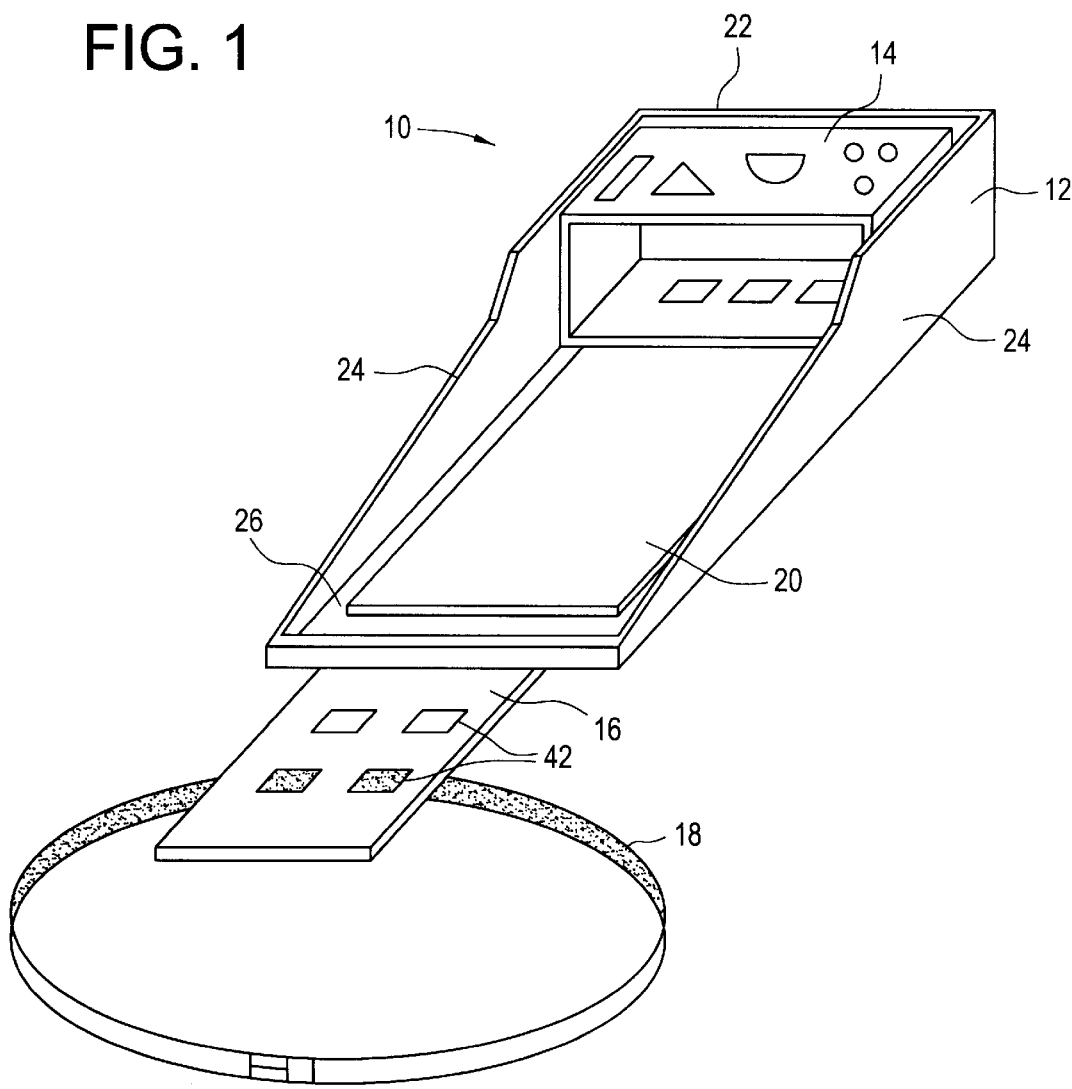
FIG. 1 is an isometric view of the flexible attached lap pad container of the present invention.

With reference to the drawings, and particularly to FIG. 1, an isometric view of flexible attached lap pad container 10 of the present invention is shown. Flexible attached lap pad container 10 includes containment part 12, receptacle part 14, flexible part 16, attachment part 18, and pad part 20. Containment part 12 includes rear panel 22 and side panels 24 attached to planar bottom panel 26 to form a generally rectangularly shaped structure with an open top and front. Side panels 24 slope downwardly from rear panel 22 to the front of containment part 12. Side panels 24 and rear panel 22 are sized and shaped to prevent small items such as a computer mouse placed within containment part 12 from falling out of containment part 12 when not in use. Although shown as a substantially rectangular shape, the width, length and shape of containment part 12 are dependent upon its intended use and the age, size, and needs of the user. It may be shaped as oblong, spherical, polygon or any other shape that fits the demands of a user. Containment part 12 is preferably made of a rigid, crease resistant material such as plastic, composite, wood, metal, or cardboard. For some users and conditions, such as children in a plane or automobile containment part 12 may be made of easily crushable material such as cardboard, and foams, thereby affording a measure of safety in an accident.

Figure 2:
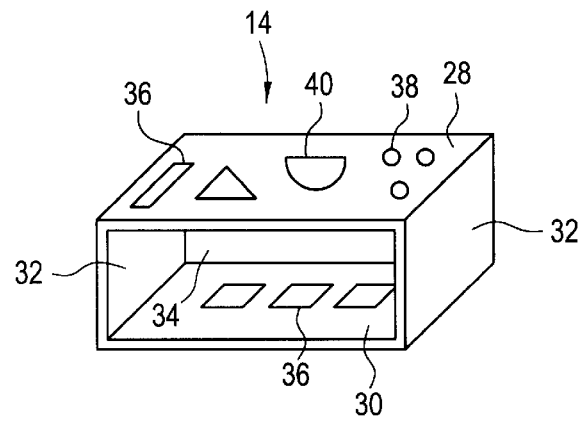
FIG. 2 is an isometric view of the receptacle part of the flexible attached lap pad container of the present invention.

As best seen in FIG. 2, receptacle part 14 is preferably a rectangular box shape with top panel 28, bottom panel 30, end panels 32, and rear panel 34. Receptacle part 14 will be dimensioned to fit within containment part 12 as seen in FIG. 1 and is preferably made of the same material as containment part 12. Top panel 28 and bottom panel 30 of receptacle part 14 may have a number of slots 36, holes 38 and openings 40 to hold user items such as pens, pencils, cups, toys or a computer mouse as used for controlling a computer cursor. Receptacle part 14 can be flipped over, thereby reversing the positions of top panel 28 and bottom panel 30 to provide different openings, slots, and holes in the bottom surface to be used. Receptacle part 14 can be rotated also so the open side will face up. In this position receptacle part 14 can hold items such as pens, pencils, playing cards, small carving knives, sewing and crocheting implements, toys, and small calculators. Receptacle part top panel 28 and bottom panel 30 will be of a length to enhance the ability of container part 12 to retain loose items such as, a computer mouse, pens and pencils when container part 12 is rotated toward the vertical plane, as when a person stands up. Receptacle part 14 may also be designed as an integral part of containment part 12.

Referring back to FIG. 1, flexible part 16 is preferably a rectangular shaped pad that has a width less than the width of containment part 12. Flexible part 16 is preferably shaped with a number of slotted openings 42 to enable attachment part 18 to weave in and out of the slotted openings. Flexible part 16 is preferably made of a flexible material such as plastic, cloth, composite, leather, flexible cardboard, or foam. Flexible part 16 is shaped to enable maximum comfort to a user, and to satisfy the user needs. Flexible part 16 connects to containment part 12 by suitable means as adhesive, sewing, or stapling.

Attachment part 18 is preferably a belt, made of such flexible materials as plastic, fabric or leather. The shape of attachment part 18 may also be tubular such as a cord or rope. Attachment part 18 will have a closure means such as a buckle or hook and loop fastener for securing flexible attached lap pad container 10 to a users waist. In the case of a child attachment part 18 may be a closed elastic loop.

Pad part 20 is preferably of a rectangular shape that will fit within the dimensions of containment part 12. The thickness and surface texture of pad part 20 is dependent upon its intended use. Pad part 20 may be made of such materials as plastic, wood, metal, cardboard, foam, rubber, or leather. Pad part 20 will be preferably rigid and non-creaseable, and able to withstand a reasonable amount of pressure on its flat planar surface. Pad part 20 is preferably easily removable but may be joined to containment part 12 by adhesives, hook and loop fasteners or integrally formed with containment part 12.

The width of flexible attached lap pad container 10 is determined by the size of a person's lap and its specific use. Applicant's testing has shown an area of 8 inches by 8 inches is needed to move a computer mouse efficiently but, a 21 inch width is required to play a game of 7-card solitaire.

Figure 3:
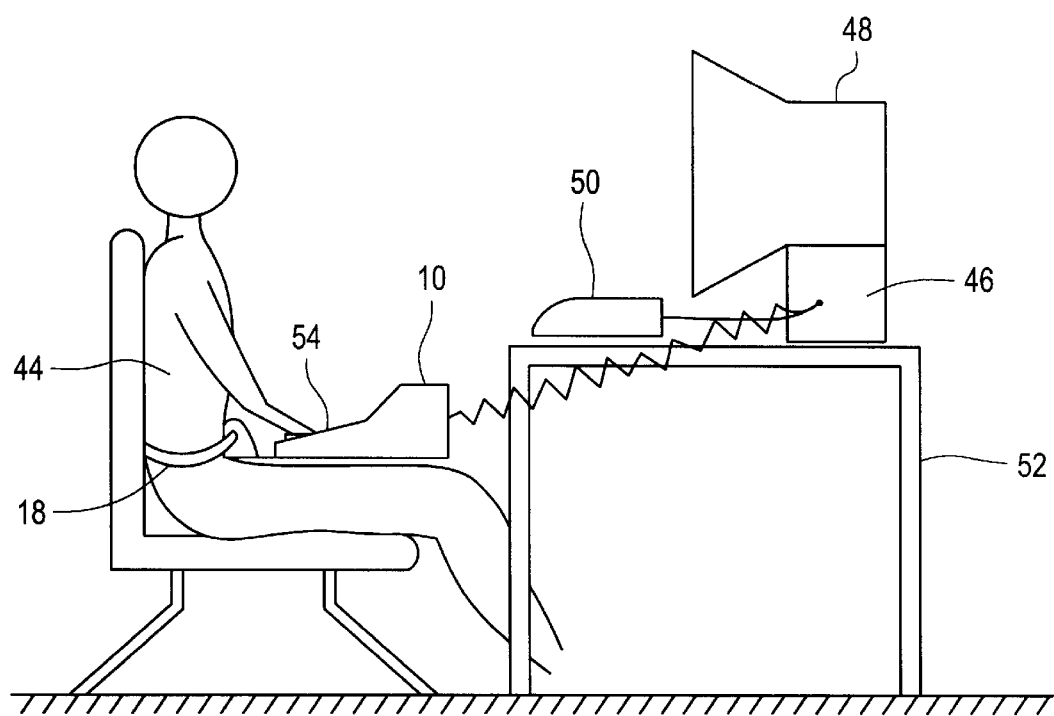
FIG. 3 is an elevation view of a user using the receptacle part of the flexible attached lap pad container of the present invention.

As best seen in FIG. 3, a typical configuration for using flexible attached lap pad container 10 with a computer mouse is shown. Computer user 44 is seated with computer 46, monitor 48 and keyboard 50 arranged in a typical configuration on table 52. Flexible attached lap pad container 10 is positioned on the lap of computer user 44 and secured about the waist of user 44 by attachment part 18. Computer mouse 54 is positioned on pad part 20 within containment part 12. Flexible attached lap pad container 10 provides a surface for computer user 44 to comfortably use and manipulate computer mouse 54 and thereby minimize repetitive stress injuries such as carpal tunnel syndrome.

Figure 4:
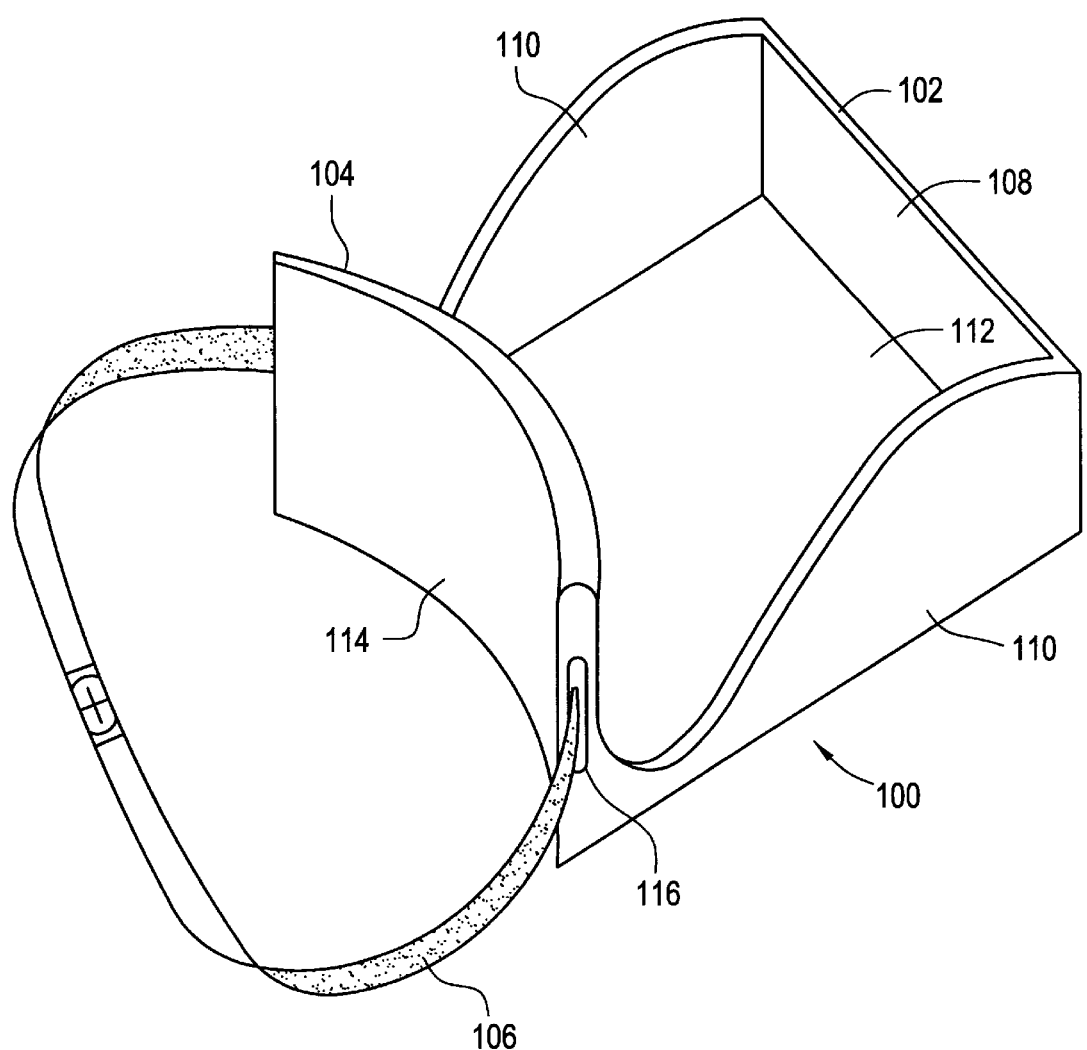
FIG. 4 is an isometric view of an alternate embodiment of the present invention with the attachment part and flexible part integrally formed with the containment part.

An alternate embodiment is shown in FIG. 4. Flexible attached lap pad container 100 is formed as an integral unit and includes containment part 102, flexible attachment part 104 and attachment part 106. Containment part 102 includes rear panel 108 and side panels 110 attached to planar bottom panel 112 to form a generally rectangularly shaped structure with an open top and front as in the preferred embodiment. Side panels 110 slope downwardly from rear panel 108 to the front of containment part 102. The side panels 110 and rear panel 108 are sized and shaped to prevent small items such as a computer mouse placed within the containment part from falling out of the containment part when not in use.

Side panels 110 and planar bottom panel 112 are integrally formed with flexible part 104. Flexible attachment part 104 has a curved contour 114 to ensure a snug and comfortable fit with the user's waist. A slot 116 is formed in flexible part 104 to accept attachment part 106. In this alternate embodiment, flexible attached lap pad container 100 is preferably formed from a molded plastic or high density foam. Such a construction is particularly advantageous when flexible attached lap pad container 100 is intended for use by a child. The integral molded construction allows the use of softer materials that would be less injurious to a child in the event of an accident if flexible attached lap pad container 100 were being used in an automobile.

Figure 5:
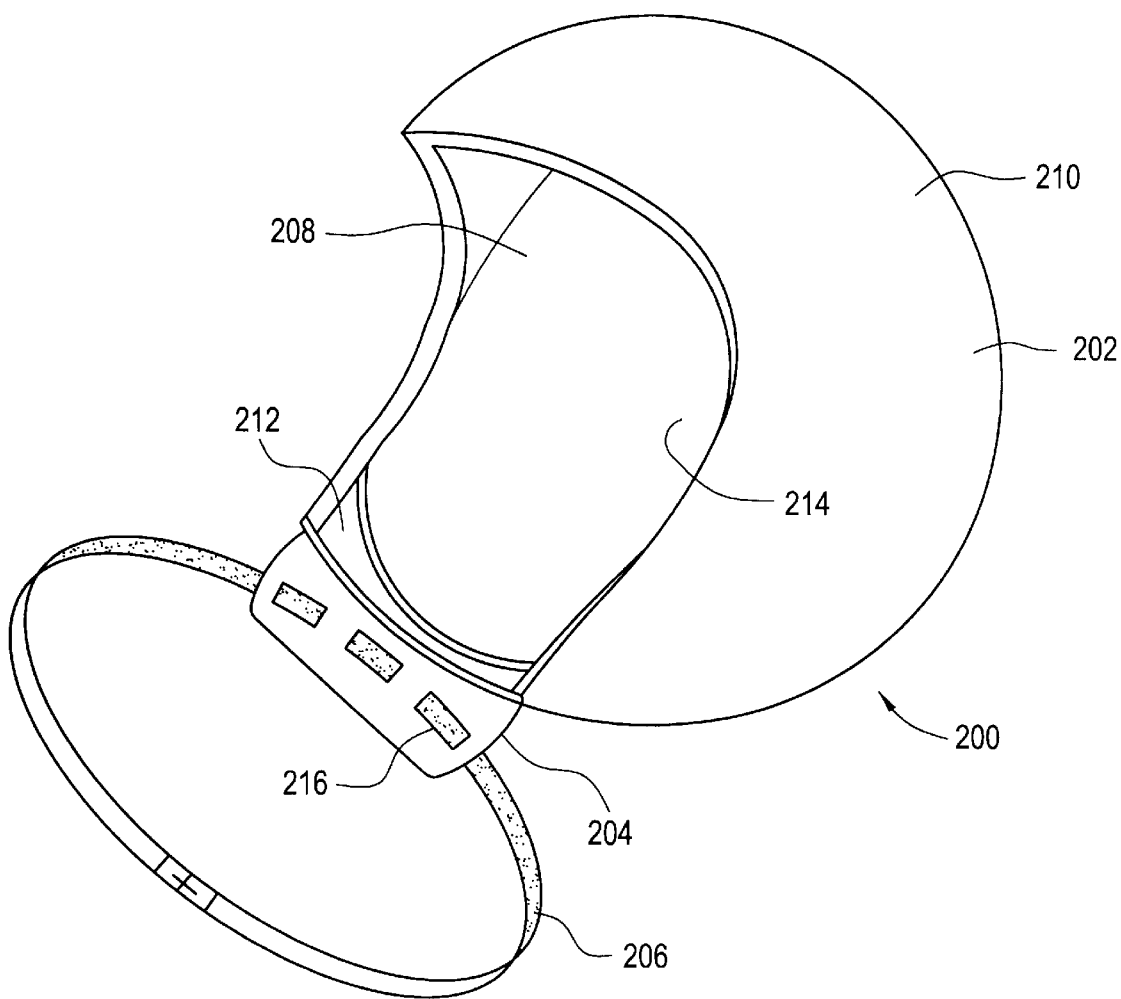
FIG. 5 is an isometric view of a second alternate embodiment of the present invention with the containment part including a hemispherical upper portion.

A second alternate embodiment is shown in FIG. 5. Flexible attached lap pad container 200 includes containment and receptacle part 202, flexible part 204, attachment part 206 and pad part 208. The containment and receptacle part 202 is formed as an integral unit and includes a hemispherical upper portion 210 attached to a planar lower panel 212 with access opening 214 adjacent thereto. Flexible part 204 may be integrally formed with containment and receptacle part 202 or formed as a separate unit and attached to containment and receptacle part 202 by suitable means. Flexible part 204 is contoured to fit a person's waist and includes slotted openings 216 that receive attachment part 206 as in the previous embodiments. Pad part 208 is sized to fit within containment and receptacle part 202 and functions as the pad parts of the previous embodiments. Flexible attached lap pad container 200 is preferably formed from a molded plastic or high density foam material. The embodiment of the present invention shown by flexible attached lap pad container 200 is advantageous due to its rounded configuration that precludes any sharp edges. Additionally, this embodiment with its partially enclosed containment and receptacle part 202 is particularly helpful in preventing items from falling off pad part 208 if the user stands or shifts position.

The construction of my flexible attached lap pad container will be readily understood from the foregoing description and it will be seen that I have provided a flexible attached lap pad container that minimizes user fatigue during manipulation of a computer mouse.

Additionally, my flexible attached lap pad container is configured to prevent items being used such as a mouse pad, pens, pencils and other items from falling off the flexible attached lap pad container during use. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A flexible attached lap pad container system to minimize user fatigue during manipulation of a computer mouse, comprising:

a containment part with a planar bottom panel sized to allow manipulation of a computer mouse;

a flexible part having a first edge attached to said containment part and a second edge contoured to fit around a person's waist;

an attachment part adapted for encircling a user's waist, said attachment part attached to said flexible part and having a closure means for securing said attachment part to a user;

a pad part shaped to fit within said containment part;

a receptacle part fitting within said containment part and including a receptacle for holding said computer mouse during rest periods;

said containment part is generally rectangularly shaped with an open top and open front;

said receptacle part is generally rectangularly shaped with an open side and sized to fit within said containment part;

said containment part includes a back panel positioned between parallel side panels, said back and side panels attached to said planar bottom panel; and, said side panels slope downwardly from said back panel to the front of said containment part.

2. A flexible attached lap pad container system to minimize user fatigue during manipulation of a computer mouse according to claim 1, wherein:

said receptacle part includes additional openings to hold user items.

3. A flexible attached lap pad container system to minimize user fatigue during manipulation of a computer mouse according to claim 2, wherein:

said flexible part includes a plurality of openings to accept said attachment part.

4. A flexible attached lap pad container system, comprising:

a containment part generally rectangularly shaped with an open top and an open front and a planar bottom panel sized to comfortably fit on a person's lap;

a receptacle part generally rectangularly shaped with an open side and sized to fit within said containment part;

a flexible part generally planar shaped having a first edge attached to said containment part and a second edge contoured to fit around a user's waist;

an attachment part including a belt adapted for encircling a user's waist, said belt attached to said flexible part and having a closure means for securing said belt to a user;

a pad part generally rectangularly shaped to fit within said containment part;

said containment part includes a back panel positioned between parallel side panels, said back and side panels attached to said planar bottom panel; and, said side panels slope downwardly from said back panel to the front of said containment part.

5. A flexible attached lap pad container system according to claim 4, wherein:

said receptacle part includes openings to hold user items.

6. A flexible attached lap pad container system according to claim 5, wherein:

said flexible part includes a plurality of openings to accept said attachment part.

7. A flexible attached lap pad container system, comprising:

a containment part with a hemispherical upper portion attached to a planar lower portion;

a flexible part integrally formed with said containment part, said flexible part contoured to fit around a person's waist;

an attachment part for encircling a user's waist, said attachment part attached to said flexible part and having a closure means for securing said attachment part to a user; and, a pad part shaped to fit within said containment part.

* * * * *